Nov. 6, 1934.  G. W. KUNTNY  1,979,330
CONTROL APPARATUS
Filed June 29, 1933   4 Sheets-Sheet 1

INVENTOR-
Gregor W. Kuntny
BY
ATTORNEY-

Nov. 6, 1934.         G. W. KUNTNY                1,979,330
                     CONTROL APPARATUS
              Filed June 29, 1933        4 Sheets-Sheet 3
FIG. 3
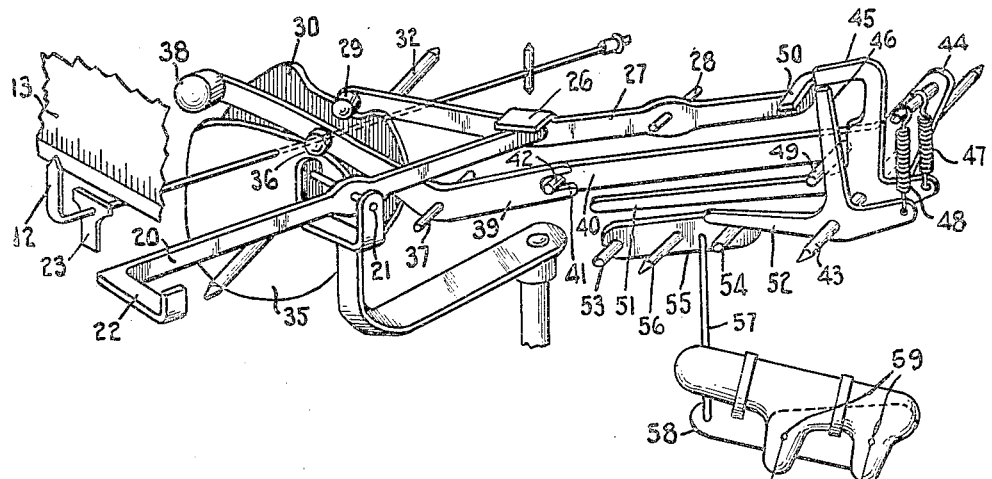
FIG. 5ᵃ
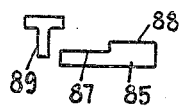
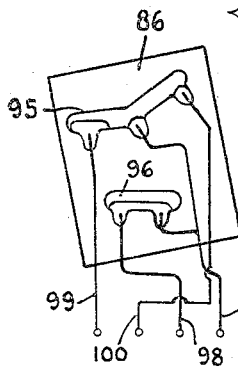
FIG. 5ᵇ
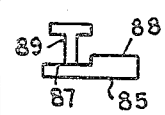
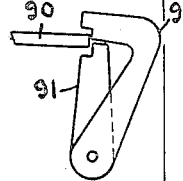
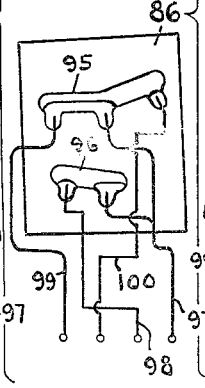
FIG. 5ᶜ
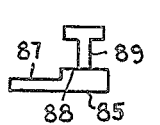
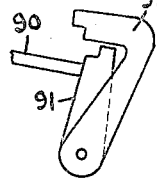
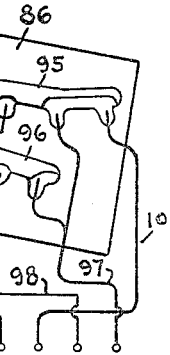
FIG. 5
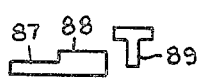
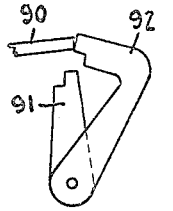
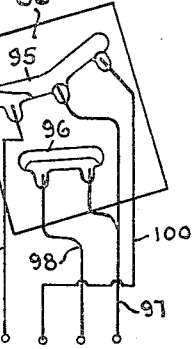
INVENTOR-
Gregor W. Kuntny
BY
ATTORNEY- Nov. 6, 1934.   G. W. KUNTNY   1,979,330
CONTROL APPARATUS
Filed June 29, 1933   4 Sheets-Sheet 4
FIG. 4
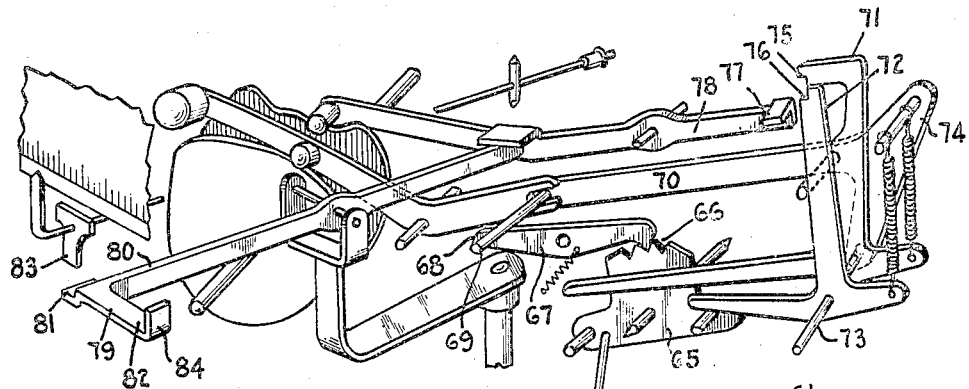
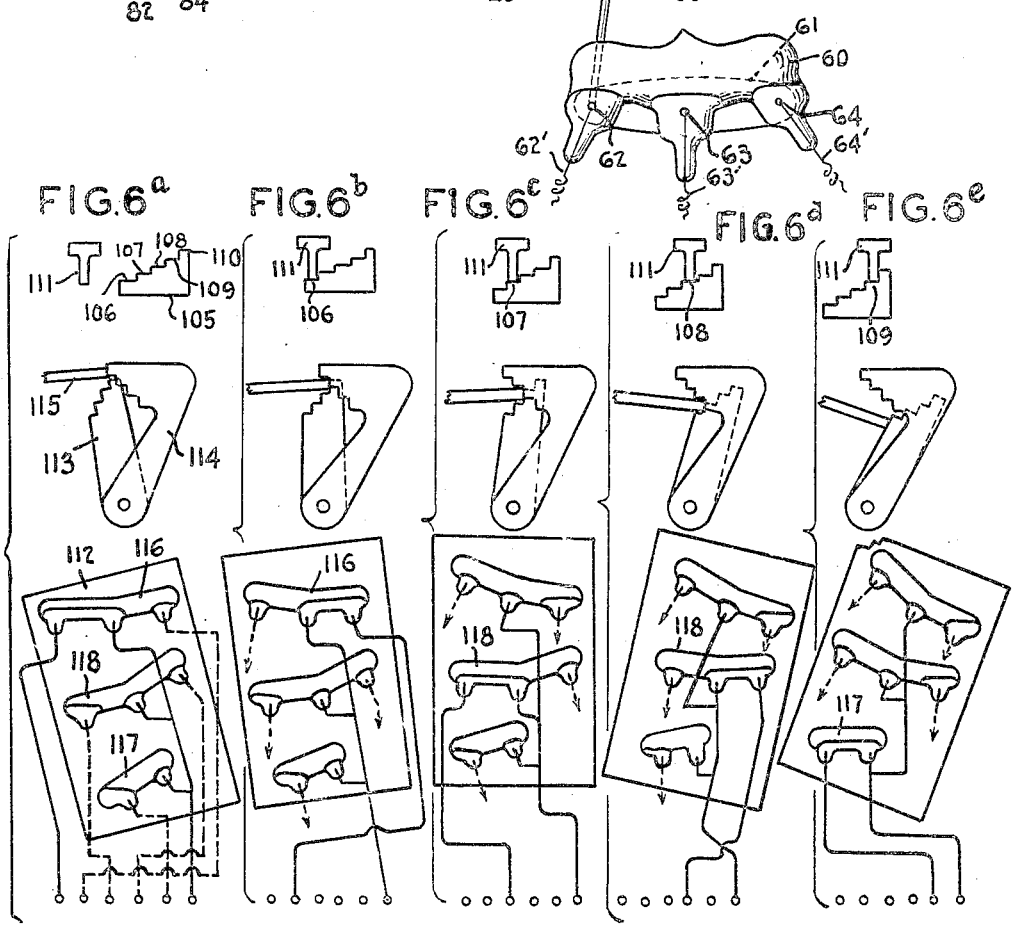
INVENTOR-
Gregor W. Kuntny
BY
ATTORNEY- Patented Nov. 6, 1934

1,979,330

UNITED STATES PATENT OFFICE 1,979,330

CONTROL APPARATUS

Gregor W. Kunthy, Naugatuck, Conn., assignor to The Bristol Company, Waterbury, Conn., a corporation of Connecticut Application June 29, 1933, Serial No. 678,304

7 Claims. (Cl. 200—56)

The invention relates to automatic control apparatus for regulating and/or maintaining a condition subject to change, for example, to apparatus embodying pyrometer and like controllers wherein the condition under control is caused to operate a deflecting meter element. This element, in turn, is arranged through intermediate mechanism to effect an electrical circuit, or circuits, controlling means adapted for the regulation and/or maintenance of the condition.

It has for an object the provision of simple and effective means which are mechanically operated to effect the opening and closing of one or more electrical circuits, as well as maintaining the same in the selected condition, and more particularly the provision of means of this nature for actuating a rugged contact device such, for example, as a mercury switch.

A further object of the invention resides in the provision of means for actuating successively a plurality of switch-means in the control of the condition, and whereby, for example, abnormal conditions may be provided for; also, whereby a so-called "trend-analyzing" or "anticipatory" control may be obtained for preventing overshooting or hunting of the control mechanism.

Still another object of the invention resides in the provision of a controller device adaptable, for example, to a multi-speed control for regulating valves and the like.

The invention has for a further object the provision of means for mechanically and positively shifting a switch, as from an electrically-driven motor, under the control of mechanical selecting means which are in turn controlled in such a manner by a relatively delicate meter element that the latter will not thereby be subject to any undue effort in the shifting operation of circuit-controlling and relatively heavy switches of the nature aforesaid.

Another object of the invention resides in the provision of a motor-operated circuit-controlling system wherein a relatively light load only is placed upon the motor during the switch-positioning operation.

In carrying out the invention, a deflecting meter element is associated with an adjustable and pivoted control member, the former being adapted to swing along the path of adjustment of the latter when deflected. The arrangement is such, moreover, that the control member and the meter element will be brought into engagement, when juxtaposed, by means of periodically operated mechanism and for the purpose of exerting one or another of opposing control effects as the deflection of the said element is in one direction or another from a neutral position relatively to the control member. This control member, in turn, determines the position of selecting mechanism in the actuation, from a suitable motor device, of mechanical means designed to effect the shifting of a contact-making element from one position to another. The arrangement of the selecting mechanism is such as to set and positively fix one of a pair of actuating members, while the other is permitted to follow, through a yieldable mechanical coupling, a motor-driven member to operate upon the switch.

Provision is made, also, whereby the shift may be accomplished successively and in such a manner that the contact-making element may assume more than two positions, the selecting means being correspondingly modified.

The nature of the invention, however, will best be understood when described in connection with the accompanying drawings, in which:

Fig. 3 is a fragmentary perspective view of the control mechanism and switch device actuated thereby.

Fig. 4 is a similar view, and illustrates a modification.

Figs. 5a, 5b, 5c and 5d are fragmentary diagrammatic views illustrating the action, in various positions of the deflecting meter element relatively to its control member, of selecting means of the nature shown in Fig. 4 and illustrates also a modification in the control element.

Figs. 6a, 6b, 6c, 6d and 6e are similar fragmentary diagrammatic views illustrating further modifications both in the control element and in the selecting means.

Figure 1:
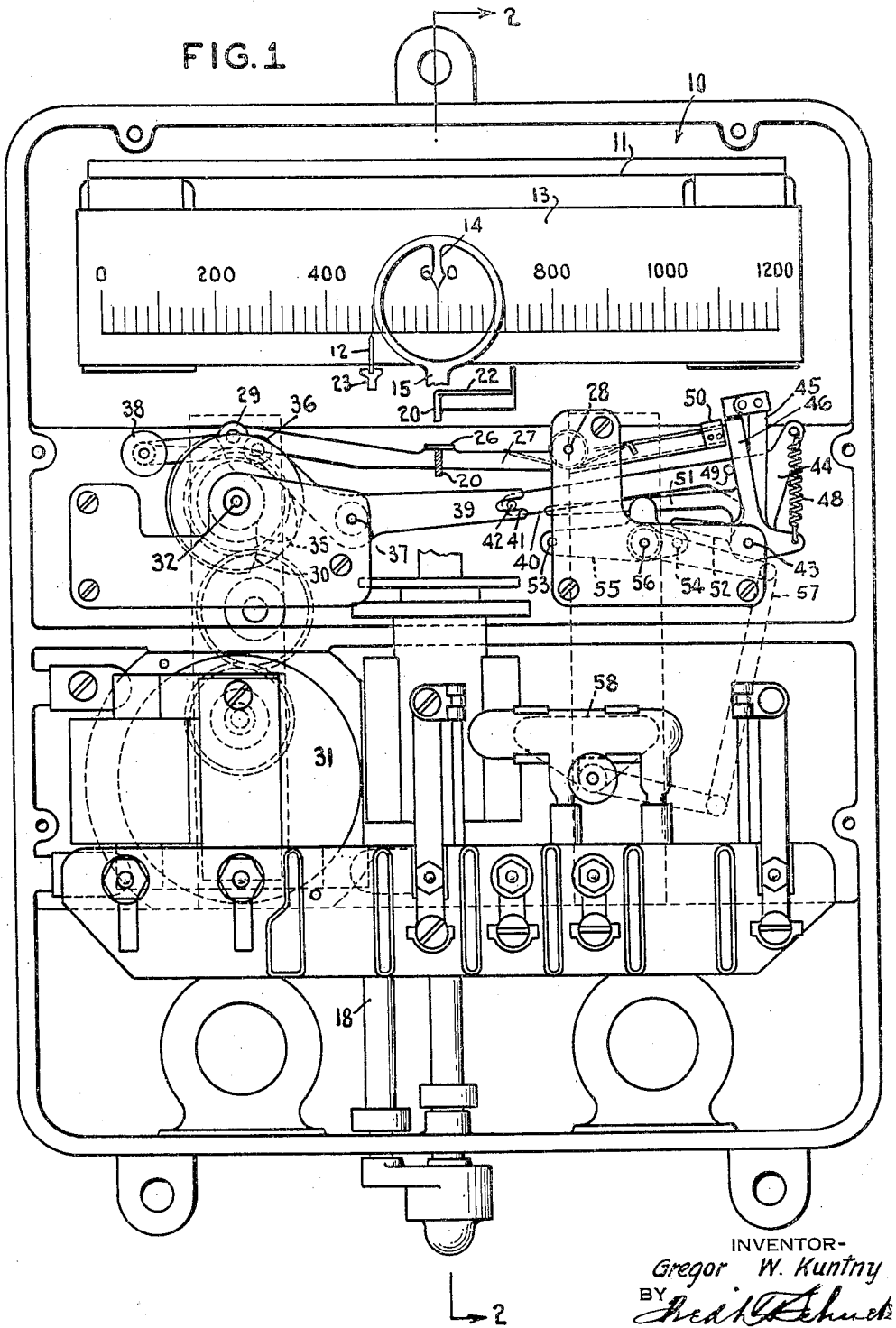
Fig. 1 is a front elevation of a control apparatus mounted within its casing, with the cover shown removed, and portions broken away and in section.
Figure 2:
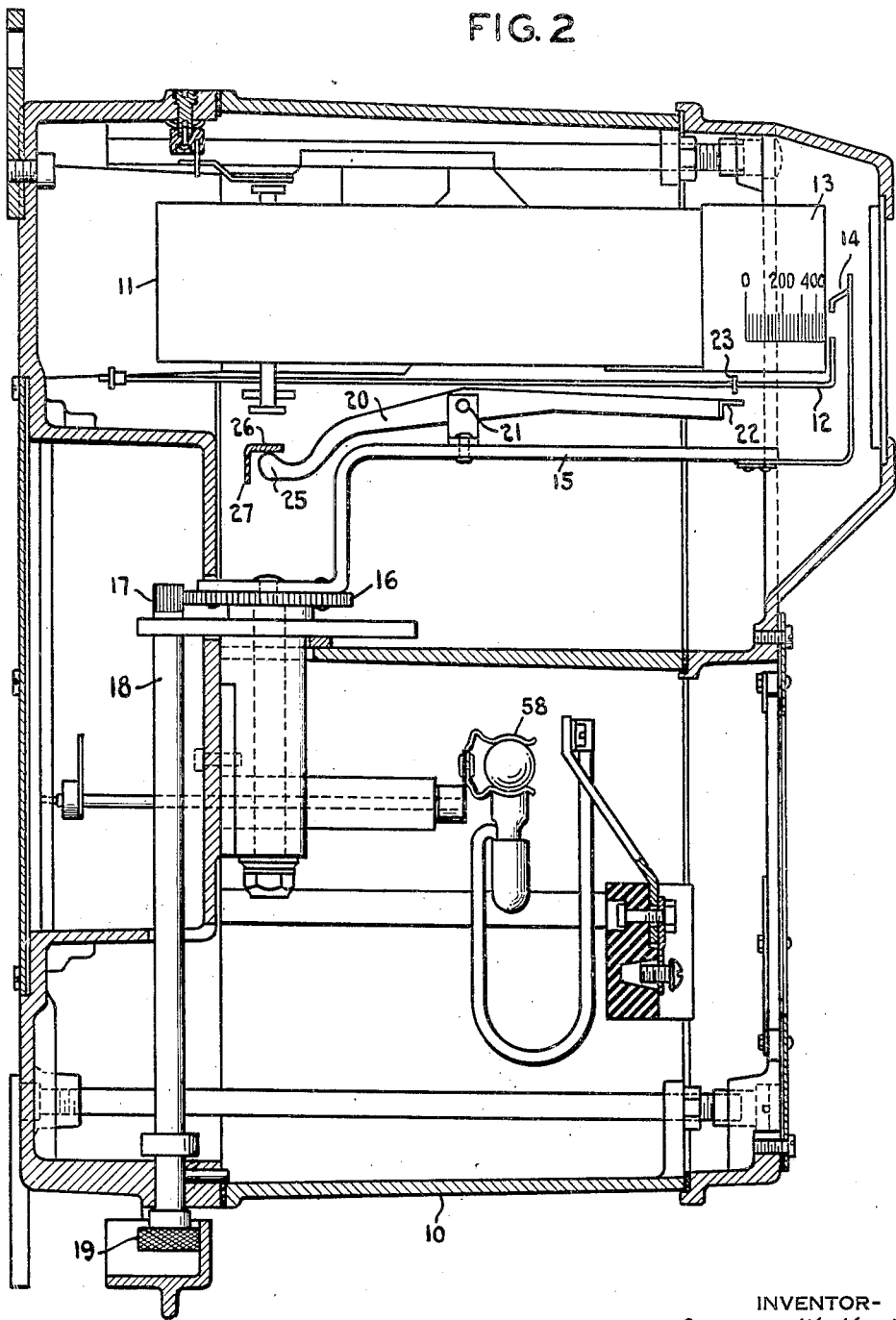
Fig. 2 is a vertical transverse section thereof taken on the line 2—2, Fig. 1, and looking in the direction of the arrows.

Referring to the drawings, 10 designates an instrument casing for housing the entire control mechanism which embodies a suitable measuring instrument or meter, indicated by the reference character 11 and having the deflecting meter or like measuring element 12 which is actuated in well known manner from a condition subject to change; and is adapted in turn to be regulated and/or maintained at a substantially constant magnitude. A scale 13 is associated with the element 12 over which is designed to be adjusted, as desired, the index or pointer 14 of a setting member 15. To this end, the pointer 14 may be angularly moved, for example, by its setting member 15 being secured to a gear 16 which, in turn, is engaged by a pinion 17 at one end of a rod 18 having the thumb-screw 19 located at its opposite end and without the casing 10 so as to be conveniently accessible for manual adjustment of the said setting member.

The said setting member 15 carries also a control member 20 which is pivoted thereto as at 21 and is provided at its outer end with a laterally projecting control platform 22 positioned beneath the path of movement of a steeple 23 of the pointer or meter element 12. The said steeple thus lies between the plane of adjustment of platform 22 and the bottom edge of the scale 13 which latter acts as a stationary anvil or abutment against which the said steeple may be forced at intervals when juxtaposed with respect to the said platform.

The inner end 25 of the control lever lies in the axis of rotation of the gear 16, and is designed to position beneath an overhanging lip or ledge 26 of a selecting lever 27 of the selecting mechanism, the outer end of the control member being slightly over-weighted to maintain always the contact between its inner end and the said lip, although allowing for the angular adjustment of the control member, as aforesaid. The selecting lever 27, furthermore, is pivoted as at 28 and its inner end is provided with the cam roller 29 designed for engagement with a cam 30 which is driven from a motor 31 through intermediate mechanism to rotate the cam shaft 32 to which the cam is secured.

The rocking motion imparted to selecting lever 27 through the action of the said cam will be transmitted, also, to the associated control member 20 through lip 26 for the purpose of elevating platform 22 of its opposite end toward the lower edge or anvil of the scale 13.

When this platform is juxtaposed with respect to the steeple 23, it will be apparent that the elevation of said platform is restricted through the interposition of the steeple; and consequently the extent of depression, under the influence of the cam 30, of the inner or cam end of lever 27 will be less than under normal conditions since the inner end of lever 20 is now fixed in an elevated position in engagement with the lip 26.

On the cam shaft 32 is provided an additional cam 35 adapted for engagement with a cam roller 36 of a further lever adapted to rock about the fulcrum 37 and provided at its one end with a counter-weight 38 tending to elevate normally its opposite end 39 but which may be depressed under the action of the cam 35.

The end 39 is, furthermore, designed to be coupled to one end 40 of a lever, as through a slot 41 of the end 39 engaging a pin 42 extending laterally from lever end 40, the latter being oscillatable with a shaft 43. The other end 44 of the coupled lever will thus be periodically oscillated under the action of cam 35 for the purpose hereinafter set forth.

On the shaft 43 are also mounted for oscillation thereon two bell cranks 45 and 46 which are arranged to remain alternatively coupled to the lever end 40 in being drawn by respective springs 47 and 48 to urge the one arm of each bell crank against a stop pin 49 projecting laterally from the end 40 of the coupled lever, and which thereby limits the inward movement of said bell cranks so that they oscillate ordinarily as a unit with the arm 40 of the coupled lever. The arms 45 and 46 of the bell crank lever, furthermore, are juxtaposed with respect to a laterally projecting finger 50 at the outer end of the selector lever, the two bell crank arms being differently positioned with respect to the finger 50 so that in assuming its alternative positions under the cam action one or the other of said arms 45, 46, will be engaged by the said finger; and the corresponding bell crank will therefore be prevented from following the oscillation of the coupled lever as the end 40 thereof is depressed under the action of cam 35, the engaged bell crank giving way due to its yielding coupling with the said lever.

It will be appreciated, also, that in this selecting operation, as well as in the subsequent shifting of a circuit-controlling switch device, there is no undue stress exerted on the delicate measuring element 12. This results from the utilization of separate sets of levers for the selecting and for the shifting and, furthermore, because of the manner of engagement between the shifting and the selecting levers whereby the former engage the latter substantially at right angles and near the "dead-center" position of the selecting lever.

The reaction of the forces required for shifting the switch device cannot reach the delicate measuring member, but is absorbed by the bearing 28 of the selector lever.

In addition, each of the said bell crank levers is provided with an inwardly extending actuating arm 51 and 52, respectively, which are designed for engagement with laterally projecting pins 53 and 54 oppositely disposed on a double crank or lever 55 adapted to rock with a shaft 56 in accordance with the engagement of a particular pin. A link 57 connects this double crank, or rather its shaft, with a movable support 58 of a suitable switch device, for example the mercury switch embodying the pair of contacts 59, to rock said switch for making or breaking the circuit between said contacts in accordance with the pin engagement aforesaid and which, in turn, is determined by the position of the selector lever 27. After such make or break of a circuit has been secured, it is to be understood that this condition will be maintained until the switch is rocked again to a different position; or, a condition may be maintained during several positions as hereinafter set forth.

Fig. 4 illustrates a modification in the switch control in that the mercury switch 60, carried by a movable support 61, is provided with three contacts 62, 63 and 64 rather than only a pair of contacts as in the previously described embodiment; and these contacts may be utilized for controlling a pair of circuits, 63' designating the common lead and 62' and 64' the other leads of the corresponding circuits. The arrangement of contacts necessitates the holding of the actuating double crank or lever member 65 in an intermediate position as the same is rocked through the pin engagement.

To this end, the double crank may be provided with suitable friction or other temporary retaining means such as a ratchet portion 66 adapted to be engaged by spring-drawn pawl 67 whose opposite end 68 contacts with a pin 69 extending laterally from the coupled lever 70 so as to partake of the oscillation thereof and free the double crank from the pawl engagement when the one end 70 of the coupled lever is depressed. Or, the pawl may be indenpedently operated, if desired.

Furthermore, the bell cranks 71 and 72, carried on shaft 73 and adapted to be rocked by the opposite end 74 of the coupled lever, are modified in accordance with the intermediate position desired, as by being stepped as indicated at 75 and 76, respectively, whereby a two-position engagement is possible with the laterally extending finger 77 of the outer end 78 of the selecting lever. In the intermediate position, both bell cranks are engaged by the finger, thus determining a neutral position of the switch; whereas when one or the other of the bell cranks only is in engagement, the circuit will be completed across the contact 62 and one or the other of the contacts 63 or 64. In this instance, the platform 79 of the control member 80 is also stepped to provide the two levels 81 and 82 thereon, the former corresponding to the intermediate or neutral position of the switch and the latter to its high circuit-closing position, the low circuit-closing position of the switch being attained when the steeple 83 is entirely off both platform levels. An end stop 84 of platform 82 limits the movement of steeple 83 in the upward direction.

Figs. 5a, 5b, 5c and 5d illustrate diagrammatically a modification in the switching arrangement, the platform 85 being of the type previously described in connection with Fig. 4 for securing a low, intermediate and high position of a movable switch-carrying member 86; and, to this end, is provided with the two platform levels 87 and 88 adapted for engagement with the steeple 89. However, the platform is not provided with an end stop, as in the previously described embodiment, but the steeple is free to pass beyond the platform level 88, Fig. 5d, and in which case a condition results similar to that in which the steeple does not engage the platform on its low side, as indicated in Fig. 5a.

The position of the movable support 86 will therefore be the same in both instances, Fig. 5b indicating the position of this support corresponding to the low platform level, and Fig. 5c its position when the steeple 89 is located upon the high-platform level 88. The corresponding positions of the selecting lever 90 and the coacting bell cranks 91 and 92 are indicated in connection with the various showings of these relations between steeple and platform.

In addition to the three-contact mercury switch 95 carried by the movable support 86, and similar to the switch 60 of the embodiment shown in Fig. 4 of the drawings, an additional two-contact switch 96 is provided thereon and is designed, when the steeple is not on its platform, to effect the closing of an additional circuit indicated by the common lead 97 and the lead 98. The leads 99 and 100, in conjunction with the common lead 97, effect the closing of circuits through the switch 95 respectively when the steeple is on the lower level and when it is on the higher level of the platform. The control by switch 96 may be in the nature of a safety or signal circuit indicating an abnormal condition and/or to effect the energization of means to call attention to this abnormal condition or to introduce temporarily more effective corrective means.

In Figs. 6a, 6b, 6c, 6d and 6e, a platform element 105 is indicated having an increased number of different levels as the levels 106, 107, 108 and 109, together with an end-stop 110. The steeple element 111 will therefore be caused to engage with the platform 105 at the different levels in accordance with its movement up or down the scale and will correspondingly vary the angular position of a switch-supporting member 112. The bell cranks 113 and 114 engaging with the selecting lever 115 are to be accordingly stepped, as indicated.

In addition to the two switches 116 and 117, similar to those indicated in connection with the description of Figs. 5a, 5b, 5c and 5d, an additional three-contact switch 118 is provided on the support 112. The angular position of this switch, as well as that of switch 117, with respect to the switch 116, is such that the latter switch will serve to close a circuit only in the position corresponding to level 106 and the off-position of the steeple 111, while switch 118 will serve to close a circuit only in the position corresponding to levels 107 and 108. Switch 117 serves to close a circuit only in the final position of the support member and corresponding to the level 109. The active circuits for the particular switch positions are those indicated by the full-line leads.

It is evident that many different combinations of circuit controls are possible with the arrangement of switches hereinbefore set forth, as well as variations thereof, and depending also on the number and arrangement of the steps of the platform; and the invention is, therefore, not to be limited to the particular combinations shown.

I claim:

1. Switch setting mechanism for electrical controller apparatus including a selector element: comprising a single oscillatable carrier, complete electrical switching means supported thereon to be actuated by oscillation of said carrier, a motor, and mechanical means, including a pair of yieldable couplings intermediate the motor and the carrier and regulated by said selector element, for positively shifting the carrier in opposite directions respectively by one or the other of the said couplings under power from said motor transmitted through both of the said couplings with yielding of the inactive coupling locked by the selector element.

2. Switch setting mechanism for electrical controller apparatus including a selector element: comprising a single oscillatable carrier, complete electrical switching means supported thereon to be actuated by oscillation of said carrier, a motor, and mechanical means, including a pair of yieldable resilient couplings intermediate the motor and the carrier and regulated by said selector element, for positively shifting the carrier in opposite directions respectively by one or the other of the said couplings under power from said motor transmitted through both of the said couplings with yielding of the inactive coupling locked by the selector element.

3. Switch setting mechanism for electrical controller apparatus including a selector element: comprising a single oscillatable carrier adapted to assume a plurality of predetermined positions, a plurality of independent complete electrical switching means supported thereon to be individually actuated by oscillation of the said carrier, a motor, and mechanical means, including a pair of yieldable couplings intermediate the motor and the carrier and regulated by said selector element, for positively shifting the carrier in opposite directions respectively by one or the other of the said couplings under power from said motor transmitted through both of the said couplings with yielding of the inactive coupling locked by the selector element.

4. Switch setting mechanism for electrical controller apparatus including a selector element:

comprising a single oscillatable carrier adapted to assume a plurality of predetermined positions, a plurality of independent complete electrical switching means supported thereon to be individually actuated by oscillation of the said carrier, a motor, mechanical means, including a pair of yieldable couplings intermediate the motor and the carrier and regulated by said selector element, for positively shifting the carrier in opposite directions respectively by one or the other of the said couplings under power from said motor transmitted through both of the said couplings with yielding of the inactive coupling locked by the selector element, means controlled by said mechanical means to maintain positively a predetermined position of the carrier when established, and means to disengage the same during shifting of the position of the carrier.

5. Switch setting mechanism for electrical controller apparatus including a selector element: comprising a single oscillatable carrier, complete electrical switching means supported thereon to be actuated by oscillation of the said carrier, a motor, a pair of levers adapted for engagement with the selector element, movable periodically by said motor and having arms for mechanically transmitting movement to the oscillatable carrier, said pair of levers including respective yielding couplings.

6. Switch setting mechanism for electrical controller apparatus including a selector element: comprising a single oscillatable carrier, complete electrical switching means supported thereon to be actuated by oscillation of said carrier, a motor, a shifting lever periodically oscillated by the motor, a pair of bell cranks pivotally carried by the shifting lever, and resilient means carried by the said shifting lever to yieldingly hold the bell cranks to the shifting lever, one arm of each bell crank being adapted for cooperation with the selecting element to be stopped thereby or to clear the same with movement of the shifting lever and in accordance with the selector element position and the other arm of the bell crank being adapted for actuation of the said oscillatable carrier.

7. Switch setting mechanism for electrical controller apparatus including a selector element: comprising a single oscillatable carrier, complete electrical switching means supported thereon to be actuated by oscillation of said carrier, a motor, a shifting lever periodically oscillated by the motor, a pair of bell cranks pivotally carried by the shifting lever, resilient means carried by the said shifting lever to yieldingly hold the bell cranks to the shifting lever, one arm of each bell crank being adapted for cooperation with the selecting element to be stopped thereby or to clear the same with movement of the shifting lever and in accordance with the selector element position and the other arm of the bell crank being adapted for actuation of the said oscillatable carrier, a detent member for engagement with the oscillatable carrier to locate the same temporarily in one of its predetermined positions, and means carried by the shifting lever for engaging said detent.

GREGOR W. KUNTNY.